US007570474B1

(12) United States Patent
Hettermann

(10) Patent No.: US 7,570,474 B1
(45) Date of Patent: Aug. 4, 2009

(54) SYSTEM, APPARATUS AND METHOD FOR AUTOMATICALLY FACILITATING THE DISCHARGE OF STATIC ELECTRICITY FROM AN APPARATUS

(75) Inventor: Mark Hettermann, Falls Church, VA (US)

(73) Assignee: American Airlines, Inc., Ft. Worth, TX (US)

( * ) Notice: Subject to any disclaimer, the term of this patent is extended or adjusted under 35 U.S.C. 154(b) by 72 days.

(21) Appl. No.: 11/415,690

(22) Filed: May 2, 2006

(51) Int. Cl.
*H05F 3/00* (2006.01)
*H02H 1/00* (2006.01)
*H01H 47/00* (2006.01)

(52) U.S. Cl. ........................ 361/218; 361/212; 361/220

(58) Field of Classification Search ................. 361/218, 361/212, 220
See application file for complete search history.

(56) References Cited

U.S. PATENT DOCUMENTS

| | | | | |
|---|---|---|---|---|
| 4,533,333 | A * | 8/1985 | Andrew et al. | 441/38 |
| 4,602,310 | A * | 7/1986 | Fenster | 361/212 |
| 4,920,642 | A * | 5/1990 | Yanai et al. | 29/860 |
| 5,159,523 | A * | 10/1992 | Claassen et al. | 361/215 |
| 6,327,131 | B1 * | 12/2001 | Thomas et al. | 361/212 |
| 6,543,076 | B1 * | 4/2003 | Worpenberg et al. | 14/71.5 |
| 7,259,954 | B2 * | 8/2007 | Edstrom et al. | 361/212 |
| 2005/0028356 | A1 * | 2/2005 | Ramirez et al. | 29/750 |

OTHER PUBLICATIONS

Finnegan, C.E.; Service Letter—Airplane Static/Electrical Grounding Recommendations; Oct. 28, 1993; pp. 1-4; Boeing, Customer Services Division.

Reed, R. David; Service Letter—Airplane Static/Electrical Grounding Recommendations; Mar. 1, 2005; pp. 1-6; Boeing, Commercial Aviation Services.

Severe Weather Safety Guidelines for Ramp Operations; ATA Recommended Procedures (ATARP) 901; 2002; pp. 1-23; Version 2004-1, Draft 4; Air Transport Association of America, Inc., Washington, D.C.

NFPA 780 Standard for the Installation of Lightning Protection Systems 2004 Edition; 2004; pp. 780-1-781-51; NFPA, Quincy, MA.

* cited by examiner

*Primary Examiner*—Fritz M. Fleming
*Assistant Examiner*—Lucy Thomas
(74) *Attorney, Agent, or Firm*—Winstead P.C.; James Johnson

(57) ABSTRACT

One embodiment of the invention facilitates automatic static discharge from an apparatus such as an aircraft. The embodiment comprises an attachment structure, such as a jet canopy, having a system grounding port. The attachment structure can be operatively coupled to an electrostatic discharge device having a contact side with a conductive surface and an attachment side with a resistive surface. The grounding conduit operatively couples the electrostatic discharge device to the system grounding port. The electrostatic discharge device is operatively coupled to the aircraft, thereby automatically discharging static electricity from the aircraft to ground.

18 Claims, 3 Drawing Sheets

SYSTEM, APPARATUS AND METHOD FOR AUTOMATICALLY FACILITATING THE DISCHARGE OF STATIC ELECTRICITY FROM AN APPARATUS

BACKGROUND INFORMATION

1. Technical Field

The present invention relates in general to static electricity discharge devices and is particularly directed to a system, device and method for automatically dissipating a static electricity charge from a surface.

2. Description of the Related Art

An undesirable aspect of aircraft (aerospace vehicle) flight is that the aircraft itself often suffers from an accumulation of electrostatic charges through various effects, including atmospheric conditions and the motion of the aircraft or parts thereof through the atmosphere. (A person of ordinary skill in the art will understand that the terms “aircraft” and “aerospace vehicle” can be used interchangeably throughout this application.) The accumulation of the electrostatic charges tends to build up potentials that can become dangerous and can cause, for example, radio frequency interference, electrical shock to persons connected with the aircraft, equipment failures and unwanted ignition of fuel and armament.

Aircraft can accumulate electrostatic charges for several reasons. For example, the atmosphere naturally carries a charge associated with the electrical field existing between the Earth and the ionosphere. This charge can be approximately 100,000 volts at a typical flying height of about 30,000 feet altitude. The low humidity present at a typical flying altitude can lead to the buildup of large electrostatic charges. An aircraft can acquire a charge of one million volts or more. This charge can be even higher for larger planes due to their increased size. Thus, an aircraft can build up static simply from its flight through the air. In addition, an aircraft can also accumulate charge while on the ground. This accumulation can occur due to dry air currents moving past the fuselage coupled with, for example, the aircraft sitting on an insulating/poor conducting surface.

In one specific example, an aircraft can accumulate charge when struck by lighting. If an aircraft is struck by lightning, the lightning initially attaches to an extremity, such as the nose or wing tip, and then moves to the fuselage. There, current can travel through the conductive exterior skin and structures of the aircraft fuselage. The current can then exit off some extremity, such as the tail or wheels. In addition, static dischargers can help remove charge from aircraft. Static discharge antennas, for example, are normally located on wing tips, rudder and elevator. These devices attempt to reduce the charge. However, such devices are primarily functional when the aircraft is in flight, as they have almost no effectiveness when the aircraft is on the ground. If the charge is not completely dissipated by the time the aircraft is ready for deplaning, a hazardous condition arises.

Thus, it is well known that the buildup of static electricity poses in-flight and ground based hazards. What is needed is a system and device that can automatically cause the discharge of static electricity from the fuselage of an aircraft before ground personnel or aircraft occupants come into contact with the skin. Such a system and device is also needed that can provide low cost static discharge and grounding systems. Such a system should be inexpensive to manufacture, install, operate and maintain. If such a system were available, it would result in cost-savings in relation to damage to facilities. More importantly, to prevent risk of injury or death to ground personnel, or others, the greatest need is for safer ways to discharge static electricity from aircraft or other surfaces, as the hazards from the build up of electrostatic charge are extreme.

SUMMARY DESCRIPTION

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

In accordance with one aspect of the present invention, one embodiment of the invention facilitates automatic static discharge from an apparatus such as an aircraft. The embodiment comprises an attachment structure, such as a jet canopy, having a system grounding port. The embodiment further comprises an electrostatic discharge device having a contact side with a conductive surface and an attachment side with a resistive surface. A grounding conduit operatively couples the electrostatic discharge device to the system grounding port. The electrostatic discharge device is operatively coupled to the aircraft, thereby discharging static electricity from the apparatus to ground.

In an alternative embodiment of the invention, the attachment structure is a loading dock. In another embodiment of the invention, the electrostatic discharge device further comprises a grounding bus bar removably and conductively attached to the electrostatic discharge device by way of the plurality of conductive fasteners. In some embodiments of the invention, the electrostatic discharge device can comprise an electrostatic discharge material that comprises conductive elements embedded therein. In some embodiments of the invention, at least one electrical feed conduit device is disposed through the electrostatic discharge material in the electrostatic discharge device to electrically and conductively couple the conductive surface and the resistive surface together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. It is intended that all such additional systems, methods, features, and advantages be included within this description, be within the scope of the present invention, and be protected by the accompanying claims.

These and other objects, features and advantages of the present invention will be more readily apparent when considered in connection with the following, detailed description of various embodiments of the invention, which description is presented in conjunction with annexed drawings below.

BRIEF DESCRIPTION OF THE DRAWINGS

The foregoing summary, as well as the following detailed description of various embodiments of the invention, will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DESCRIPTION OF THE EMBODIMENTS

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

To those skilled in the art, the invention admits of many variations. The following is a description of various embodiments of the invention, offered as illustrative of the invention but not restrictive of the scope of the invention. Therefore, before explaining various embodiments of the invention, it will be understood by one skilled in the art that the embodiment of the invention described herein has functional and operational applicability in many various areas of industry.

Specifically, the present invention is contemplated to have a plurality of diverse applications in addition to the example aircraft/airline industry application as is detailed herein. More specifically, it is contemplated that the invention described herein can be used in virtually any industry setting, commercial or private, wherein the desire is to safely and automatically remove the built up static charge on the surface of an apparatus. Such types of industry applications include, but are not limited to, any loading dock application, space vehicles, fire truck applications, fueling truck applications, passenger trains or the like, ocean vessel shipping industry applications and virtually any freight or other type operations conceivable wherein the desire is to remove an unsafe charge from an apparatus or structure before human contact or equipment that is not properly grounded comes into contact with the apparatus.

Figure 1A:
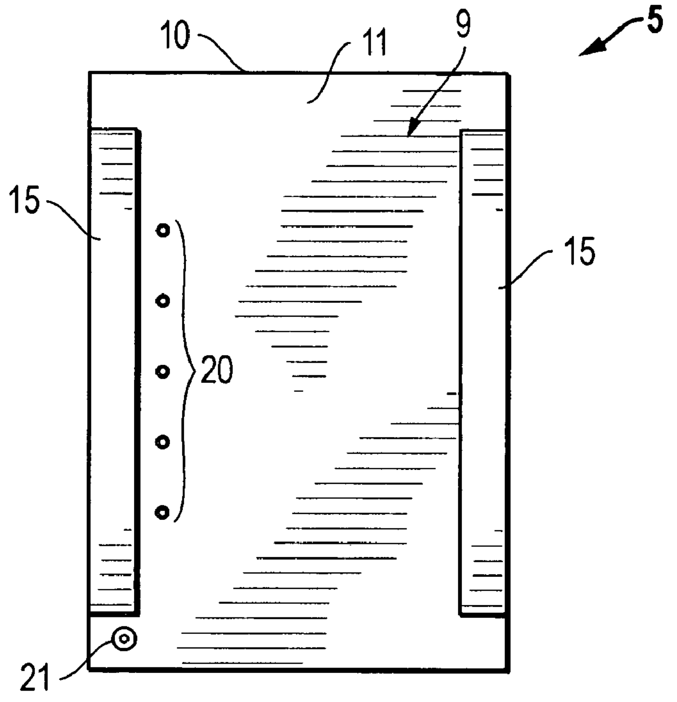
FIG. 1A depicts a profile view of the attachment side of an electrostatic discharge device according to one embodiment of the present invention.
Figure 1B:
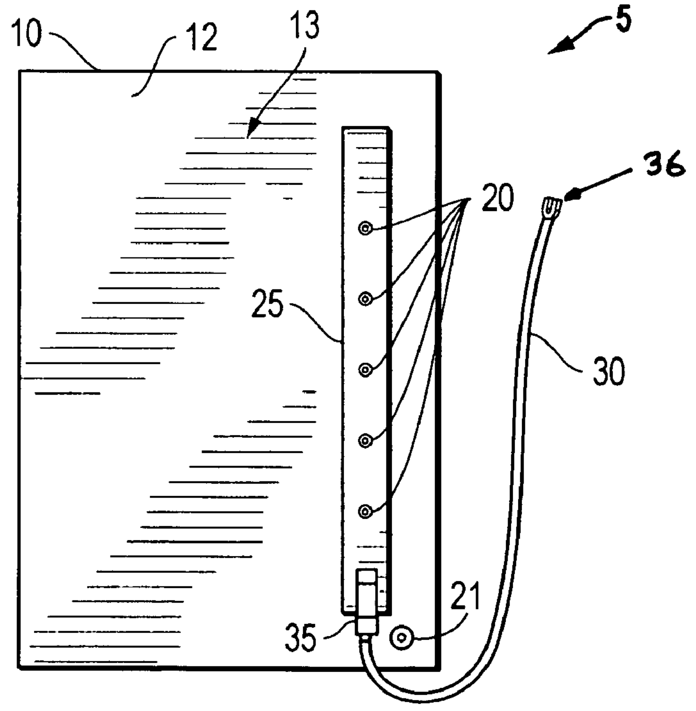
FIG. 1B depicts a profile view of the contact side of the electrostatic discharge device shown in FIG. 1A, having a grounding cable attached to the static discharge device according to one embodiment of the present invention.

FIGS. 1A and 1B disclose an electrostatic discharge device 5 according to one embodiment of the present invention. The electrostatic discharge device 5 can be constructed from an electrostatic discharge material 10, such as a silicone rubber material or the like, comprising conductive elements that are embedded in the material 10. In other embodiments of the invention, the electrostatic discharge material may be a substantially homogenous conductive material. In one embodiment of the invention, the electrostatic discharge material 10 is cut to dimensions of about 3 feet long by 2 feet wide utilizing any means for cutting the material 10 such as, but not limited to, standard heavy duty scissors. The electrostatic discharge material 10 is commonly available in a variety of pad sizes or from bulk rolled material in the industry and is available from various electronic test equipment and electronic component suppliers (e.g. "Techni-Tool").

The electrostatic discharge material 10 utilized for the electrostatic discharge device 5 comprises a mounting side 9 having a resistive surface 11. The material 10 utilized for the electrostatic discharge device 5 further comprises a contact side 13 having a conductive surface 12. The resistive properties of the electrostatic discharge material 10 help prevent damage to the surface of an aircraft due to arcing that might occur when the conductive surface 12 of the electrostatic discharge material 10 comes in contact with an aircraft fuselage 45 (shown in FIGS. 2 and 3). At least one electrical feed conduit device 21 is disposed through the electrostatic discharge material 10 in the electrostatic discharge device 5 to electrically and conductively couple the conductive surface 12 and the resistive surface 11 together.

The conductive surface 12 and resistive surface 11 of the electrostatic discharge material 10 are also electrically connected together by way of a plurality of conductive fasteners 20 (further described below). The conductive surface 12 of the electrostatic discharge device 5 is the side that comes into automatic contact with the aircraft fuselage 45 when the method for automatically facilitating the discharge of static electricity from an apparatus is accomplished according to one embodiment of the present invention. As previously described, the electrostatic discharge device 5 of the present invention is not limited only to application in the aircraft/airline industry as is used herein this disclosure.

Figure 2:
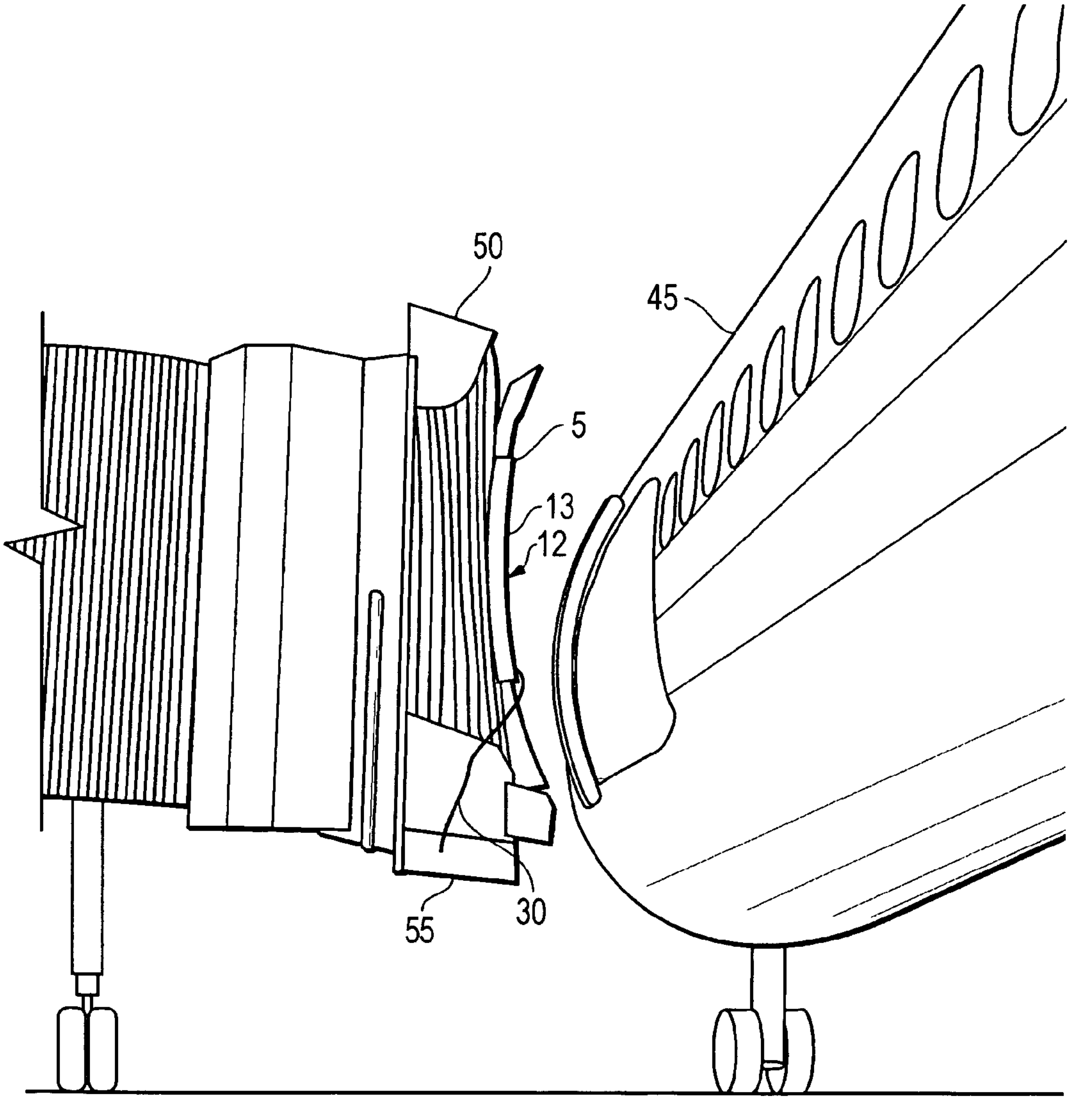
FIGS. 2 and 3 graphically depict the electrostatic discharge device of FIGS. 1A and 1B positioned for use on a jet bridge according to one embodiment of the present invention.
Figure 3:
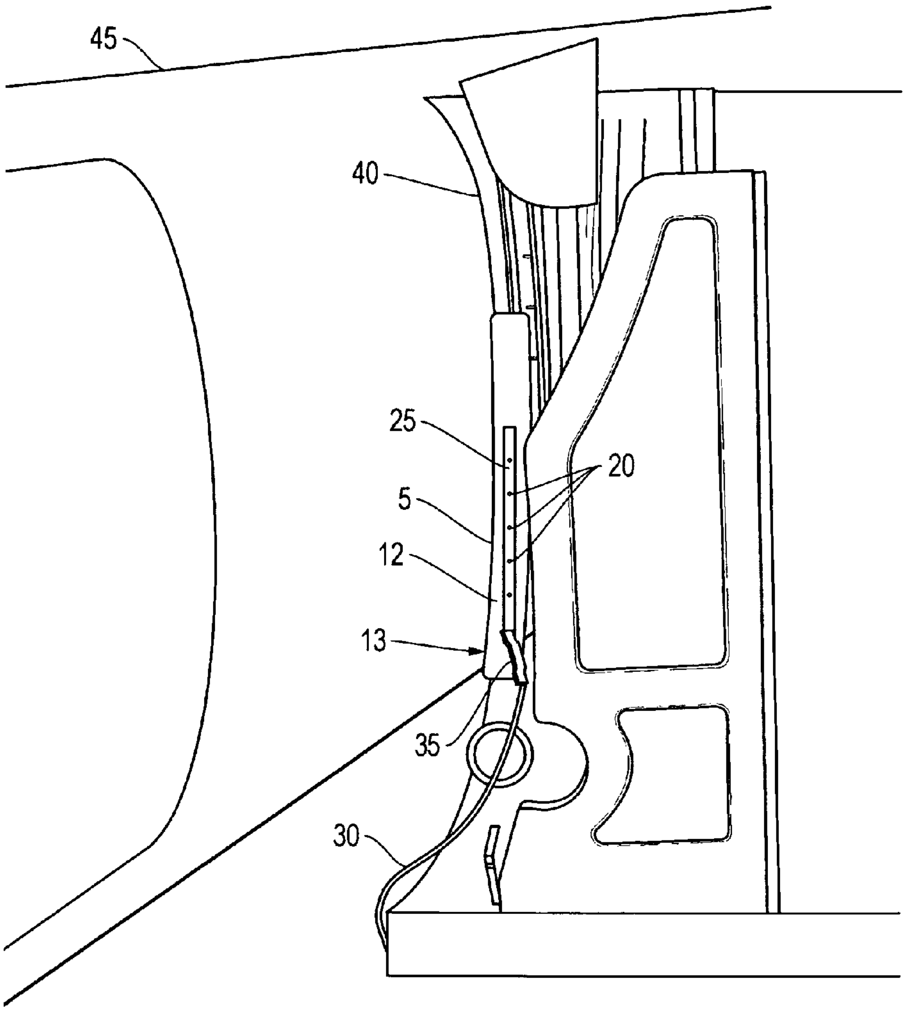

The electrostatic discharge device 5 further comprises a plurality of device attachment strips 15 such as, but not limited to, heavy duty hook and loop fastener material, industrial adhesive tape or glue or other fastening materials that can successfully provide removable attachment to a surface. Specifically, in accordance with one embodiment of the present invention, the plurality of device attachment strips 15 facilitate electrostatic discharge device 5 attachment to a jet bridge canopy 40, as shown in FIGS. 2 and 3. However, it will be understood by one skilled in the art that the electrostatic discharge device 5 of the present invention can be attached to virtually any surface mounting apparatus that will effectuate automatic, hands-free, contact with a surface requiring periodic static discharge dissipation/removal before human contact can be made with the surface. Therefore, the plurality of device attachment strips 15 can be used with any such application desired.

In continued reference to one embodiment of the invention disclosed in FIGS. 1A and 1B, the electrostatic discharge device 5 of the present invention, further comprises a grounding bus bar 25 that is removably and conductively attached to the electrostatic discharge device 5 by way of the plurality of conductive fasteners 20 (described above) such as, but not limited to, grommets or screw and nut combinations. The grounding bus bar 25 of one embodiment of the invention is manufactured from a conductive strip of metal with generally longitudinal dimensions that can range from about 2½ feet to the full length of the electrostatic discharge material. The bus bar 25 can be about ½ inch to 1 inch wide. The plurality of conductive fasteners 20 extend through each of the resistive surface 11 and the conductive surface 12 and through the grounding bus bar 25 for an electronically conductive connection.

Furthermore, the grounding bus bar 25 is manufactured from a material having sufficient conductive properties and of sufficient thickness to carry at least a charge that is equivalent to the charge traveling through a grounding cable 30 that is removably attached to at least one portion of the grounding bus bar 25 and eventually to a system grounding port 55 (shown in FIG. 2). The grounding cable 30 utilized in one embodiment of the invention is 10 gauge cable that is commercially available. Other embodiments of the invention use cable ranging from 8 to 12 gauge. The grounding cable 30 utilized with one embodiment of the electrostatic discharge device 5 of the present invention is safely capable of discharging at least 28,000 volts to the system grounding port 55.

In further reference to FIG. 1B, the grounding cable 30 utilized with one embodiment of the electrostatic discharge device 5 further comprises two opposite ends, wherein one end is, for example only, removably attachable to at least one end of the grounding bus bar 25 by way of a grounding cable electrostatic discharge device interfacing member 35. The grounding cable electrostatic discharge device interfacing member 35 can be, but is not limited to, an alligator type clip, or the like, or a screw and nut combination. At the end opposite the grounding cable electrostatic discharge device interfacing member 35, a clamping member 36 is provided on the grounding cable 30 for, as an example, removable attachment to a system grounding port 55 (as shown in FIG. 3) located on the jet bridge 50 (as shown in FIG. 3).

Now referring to FIGS. 2 and 3, the electrostatic discharge device 5 of one embodiment of the present invention can be removably installed onto a portion of the jet bridge canopy 40. (Other embodiments of the invention may include permanently connecting the electrostatic discharge device 5 to the jet bridge canopy 40.) Further, the clamping member 36 (shown in FIG. 1B) of grounding cable 30 is attached to the system grounding port 55 generally located on a bottom portion of the jet bridge 50. When properly and operationally installed during routine operation, the electrostatic discharge device 5 of the present invention is caused to routinely and automatically make hands free and unassisted contact with the aircraft fuselage 45 as the jet bridge 50 is mechanically positioned by personnel over the doorway and into fuselage 45 contact with an aircraft prior to opening of the door for deplaning of passengers.

When the electrostatic discharge device 5 is installed having the dimensions detailed above, the amount of physical width contact that will be made with the aircraft fuselage depends on the surface width of the portion of the jet bridge canopy 40 where the electrostatic discharge device 5 is installed. In one embodiment of the present invention, the jet bridge canopy 40 utilized provided approximately 4 to 6 inches of wrap-around width by the full electrostatic discharge device 5 length on the jet bridge canopy 40 portion that was made to contact the aircraft fuselage 45.

It will be understood by one skilled in the art that such contact measurements may vary in application but that only a sufficient portion of the electrostatic discharge material 10 must contact the surface desiring static discharge removal. Upon immediate contact of the electrostatic discharge device 5 with the aircraft fuselage 45, substantially the entire built up charge existing on the aircraft fuselage 45 is instantaneously and automatically dissipated, thereby permitting safe operation with no discernable arcing when opening of the aircraft door by personnel for deplaning of passengers.

In one embodiment of the invention, the electrostatic discharge device is installed on the lower half of at least one of the vertical walls of the jet bridge canopy 40.

Again, it will be understood by one skilled in the art that the electrostatic device 5 and its implementation has applicability in a plurality of commercial aspects wherein discharge of static electricity build up is crucial to personnel and equipment safety. Therefore, the present invention's device and application is not meant to be limited for use in the aviation industry alone. For example, in the trucking industry, the electrostatic discharge device can be attached to any type of apparatus that contacts a tractor-trailer, provided that that apparatus has a good grounding system and the grounding cable is attached to the grounding system.

In an alternative embodiment of the device described in regard to FIG. 1B, the electrostatic discharge device does not contain a grounding bus bar. Instead, the electrostatic discharge device is connected to the grounding cable electrostatic discharge device interfacing member via, for example, conductive threads located in the electrostatic discharge device. The connection may also be made, for example, using an electrical feed conduit device. The grounding cable electrostatic discharge device interfacing member is then operatively coupled to a ground cable which is operatively coupled to a system grounding port.

Device Testing

A test of one embodiment of the present invention's electrostatic discharge device 5 was conducted by electrically charging a test aircraft's aircraft fuselage 45 beyond a charge that would be anticipated to be accumulated during flight or while parked on the ramp of an airport. The charge was built up on the test aircraft using a sufficiently large power supply. Specifically, the present test utilized a power supply for a cathode ray tube from a television monitor.

An electrostatic locator meter device, such as an ACL Model 300B having a metering range from 0 volts to 30,000 volts, was then utilized to measure the built up charge. Thereafter, the electrostatic discharge device 5 of the present invention was properly grounded in the system grounding port 55 and the electrostatic discharge device 5 was touched to the surface skin of the aircraft fuselage 45 utilizing a long insulated plastic rod. Immediately after contact of the electrostatic discharge device 5 to the surface of the fuselage 45, the ACL 300B electrostatic locator meter device (described above) was utilized to properly measure the dissipated charge. The test provided results showing a full dissipation of the built up charge in less than 2 seconds following contact of the electrostatic discharge device 5 of the present invention to the aircraft fuselage 45.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

What is claimed is:

1. A system for effectuating the removal of an electrostatic charge, the system comprising:

an attachment structure, the structure having a system grounding port;

an electrostatic discharge device operatively coupled to the structure, the device comprising a contact side having a conductive surface and an attachment side having a resistive surface; and a grounding cable operatively coupled to the electrostatic discharge device and the system grounding port;

wherein the electrostatic discharge device is manufactured from an electrostatic discharge (ESD) material;

wherein the electrostatic discharge device further comprises an electrical feed conduit disposed substantially through the ESD material, wherein the electrical feed conduit provides electrical and conductive coupling between the contact side and the attachment side.

2. The system as in claim 1 wherein the attachment structure is the canopy of a jet bridge.

3. The system as in claim 1 wherein the attachment structure is a loading dock.

4. The system as in claim 1 further comprising a grounding bus bar operatively coupled to the electrostatic discharge device and the grounding cable.

5. The system as in claim 4 wherein a plurality of conductive fasteners operatively couple the grounding bus bar to the conductive surface of the electrostatic discharge device.

6. The system as in claim 5 wherein the conductive fasteners extend substantially through the resistive surface, the conductive surface and the grounding bus bar.

7. The system as in claim 1 wherein the grounding cable is of sufficient gauge to conduct a static discharge of at least 28,000 volts from the electrostatic discharge device to the system grounding connection.

8. An apparatus for effectuating the removal of an electrostatic charge, the system comprising:

an electrostatic discharge device operatively coupled to a structure having a grounding port, the device comprising a contact side having a conductive surface and an attachment side having a resistive surface; and a grounding cable that is operatively coupled to the electrostatic discharge device and that can be operatively coupled to the structure's grounding port;

wherein the electrostatic discharge device is manufactured from an electrostatic discharge (ESD) material;

wherein the electrostatic discharge device further comprises an electrical feed conduit disposed substantially through the ESD material, wherein the electrical feed conduit provides electrical and conductive coupling between the contact side and the attachment side.

9. The apparatus as in claim 8 wherein the attachment structure is the canopy of a jet bridge.

10. The apparatus as in claim 8 wherein the attachment structure is a loading dock.

11. The apparatus as in claim 8 further comprising a grounding bus bar operatively coupled to the electrostatic discharge device and the grounding cable.

12. The apparatus as in claim 11 wherein a plurality of conductive fasteners operatively couples the grounding bus bar to the conductive surface of the electrostatic discharge device.

13. The apparatus as in claim 12 wherein the conductive fasteners extend substantially through the resistive surface, the conductive surface and the grounding bus bar.

14. The apparatus as in claim 8 wherein the grounding cable is of sufficient gauge to conduct a static discharge of at least 28,000 volts from the electrostatic discharge device to the system grounding connection.

15. A method for facilitating automatic static discharge from an apparatus, the method comprising:

providing an attachment structure having a system grounding port;

providing an electrostatic discharge device, the device comprising a contact side having a conductive surface and an attachment side having a resistive surface; operatively coupling a grounding cable to the electrostatic discharge device and the system grounding port; and operatively coupling the apparatus to the electrostatic discharge device, thereby discharging static electricity from the apparatus to ground.

16. The method as in claim 15 wherein the attachment structure is the canopy of a jet bridge and the apparatus is an aircraft.

17. The method as in claim 15 wherein the attachment structure is a loading dock.

18. The method as in claim 15 further comprising the step of operatively coupling a grounding bus bar to the electrostatic discharge device and the grounding cable.

* * * * *